US012292702B2

(12) United States Patent
Kajiura

(10) Patent No.: US 12,292,702 B2
(45) Date of Patent: May 6, 2025

(54) IMAGE FORMING APPARATUS INCLUDING DEVELOPER CARRIER THAT IS ROTATABLE IN FORWARD DIRECTION AND REVERSE DIRECTION

(71) Applicant: SHARP KABUSHIKI KAISHA, Sakai (JP)

(72) Inventor: Ikuya Kajiura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/372,348

(22) Filed: Sep. 25, 2023

(65) Prior Publication Data

US 2024/0103397 A1 Mar. 28, 2024

(30) Foreign Application Priority Data

Sep. 28, 2022 (JP) ................................ 2022-154289

(51) Int. Cl.
*G03G 15/08* (2006.01)

(52) U.S. Cl.
CPC ....... *G03G 15/0812* (2013.01); *G03G 15/081* (2013.01)

(58) Field of Classification Search
CPC ............ G03G 15/0812; G03G 15/081; G03G 2215/0609; G03G 2215/0811; G03G 2215/0844
USPC ........................................ 399/274, 275, 284
See application file for complete search history.

(56) References Cited

U.S. PATENT DOCUMENTS 7,567,764 B2 * 7/2009 Yamanaka ......... G03G 15/0812 399/53
8,588,662 B2 * 11/2013 Kunihiro ............ G03G 15/0815 399/273
9,454,105 B1 * 9/2016 Onishi ............... G03G 15/0935
2011/0052271 A1 * 3/2011 Akedo ............... G03G 15/0812 399/274
2011/0229216 A1 * 9/2011 Iwamura ............ G03G 15/0812 399/274
2016/0147172 A1 * 5/2016 Watanabe .......... G03G 15/0808 399/272
2017/0351195 A1 * 12/2017 Koshizuka ......... G03G 15/0921
2018/0024483 A1 * 1/2018 Kato ...................... G03G 15/50 399/94

(Continued)

FOREIGN PATENT DOCUMENTS

JP 2013-020092 A 1/2013

*Primary Examiner* — Robert B Beatty
(74) *Attorney, Agent, or Firm* — ScienBiziP, P.C.

(57) ABSTRACT

A developing device of an image forming apparatus includes a rotatable developer carrier, a layer regulating member, a storage, a developer tank, and a side part on which a first inclined surface is provided. The first inclined surface is inclined with respect to a horizontal plane such that a distance from the developer carrier increases as the first inclined surface approaches the storage from a side of the layer regulating member. A distance between the layer regulating member and the developer carrier is smaller than a shortest distance between the first inclined surface and the developer carrier. The image forming apparatus executes a loosening mode in which, after image formation is ended, the developer carrier is rotated in a direction opposite to a forward direction and then, rotated in the forward direction, when a predetermined condition is satisfied.

6 Claims, 12 Drawing Sheets

(56) References Cited

U.S. PATENT DOCUMENTS

| | | | | |
|---|---|---|---|---|
| 2020/0183300 | A1* | 6/2020 | Shiomi | G03G 15/0812 |
| 2021/0072663 | A1* | 3/2021 | Kato | G03G 15/0815 |

* cited by examiner

FIG. 6

| | | AIR TEMPERATURE (℃) | | | | |
|---|---|---|---|---|---|---|
| | | ~15 | ~20 | ~25 | ~30 | 30.1~ |
| HUMIDITY (%) | ~10 | 0 | 0 | 0 | 0 | V1 |
| | ~20 | 0 | 0 | 0 | V1 | V1 |
| | ~30 | 0 | 0 | V1 | V1 | V1 |
| | ~40 | 0 | 0 | V1 | V1 | V1 |
| | ~50 | 0 | V1 | V1 | V1 | V1 |
| | ~100 | V1 | V1 | V1 | V1 | V1 |

IMAGE FORMING APPARATUS INCLUDING DEVELOPER CARRIER THAT IS ROTATABLE IN FORWARD DIRECTION AND REVERSE DIRECTION

BACKGROUND OF THE INVENTION

Field of the Invention

The present disclosure relates to an image forming apparatus.

Description of the Background Art

A developing device for a printer in which a developer including a magnetic carrier and a toner is supplied to a supply chamber is known. In such a developing device, the developer supplied to the supply chamber is attracted to a surface of a developing sleeve rotating in a forward direction by a magnetic force and is regulated to a predetermined amount by a doctor blade. Then, the toner in the predetermined amount of the developer attracted to the surface of the developing sleeve rotating in the forward direction is supplied to a photosensitive drum by the magnetic force, whereby developing processing is performed.

In the aforementioned developing device, a toner aggregate grows inside a corner formed by a doctor base and a doctor auxiliary member of the doctor blade by the developing processing, but after the developing processing, it is assumed that the toner aggregate at the corner formed by the doctor base and the doctor auxiliary member can be removed by repeating the rotation in the forward direction and a rotation in a reverse direction a plurality of times while changing a rotation speed of the developing sleeve.

In the aforementioned developing device, the toner aggregate is removed by moving the toner aggregate having grown to a depth of the corner formed by the doctor auxiliary member and the doctor base along a surface of the doctor auxiliary member and by dropping it into the supply chamber, but since the doctor auxiliary member is disposed horizontally, efficiency of moving the toner aggregate along the surface of the doctor auxiliary member is poor. In addition, since a distance when the developing sleeve is rotated in the forward direction and the reverse direction in order to remove the toner aggregate is not considered, the efficiency for removing the toner aggregate is poor. An object of the present disclosure is to provide an image forming apparatus that efficiently removes a toner aggregate.

SUMMARY OF THE INVENTION

An image forming apparatus according to an aspect of the present disclosure is an image forming apparatus including a developing device having a developer carrier that carries a developer on a surface thereof and is rotatable in a forward direction or a reverse direction, a layer regulating member that regulates a layer thickness of the developer carried by the developer carrier, and a developer tank that has a storage that stores the developer to be carried by the developer carrier and to which the developer carrier and the layer regulating member are attached, in which the developer tank has a side on which a first inclined surface inclined with respect to a horizontal plane is provided at a position adjacent to the layer regulating member and opposing the developer carrier such that a distance from the developer carrier becomes larger as the developer tank approaches from the layer regulating member side to the storage, the layer regulating member is attached to the side such that a distance from the developer carrier is smaller than a shortest distance between the first inclined surface and the developer carrier, the image forming apparatus executes a loosening mode in which the developer carrier is rotated in the forward direction during image formation, and when a predetermined condition is satisfied, after the image formation, the developer carrier is rotated in a direction opposite to the forward direction by a length or more in a circumferential direction opposed to the first inclined surface and then rotated in the forward direction.

According to the image forming apparatus according to the aspect of the present disclosure, a toner aggregate can be efficiently removed.

BRIEF DESCRIPTION OF THE DRAWINGS

FIG. 6 is a diagram illustrating a predetermined condition for a controller according to the Embodiment to execute a loosening mode.

DESCRIPTION OF THE PREFERRED EMBODIMENTS

Embodiment

Figure 1:
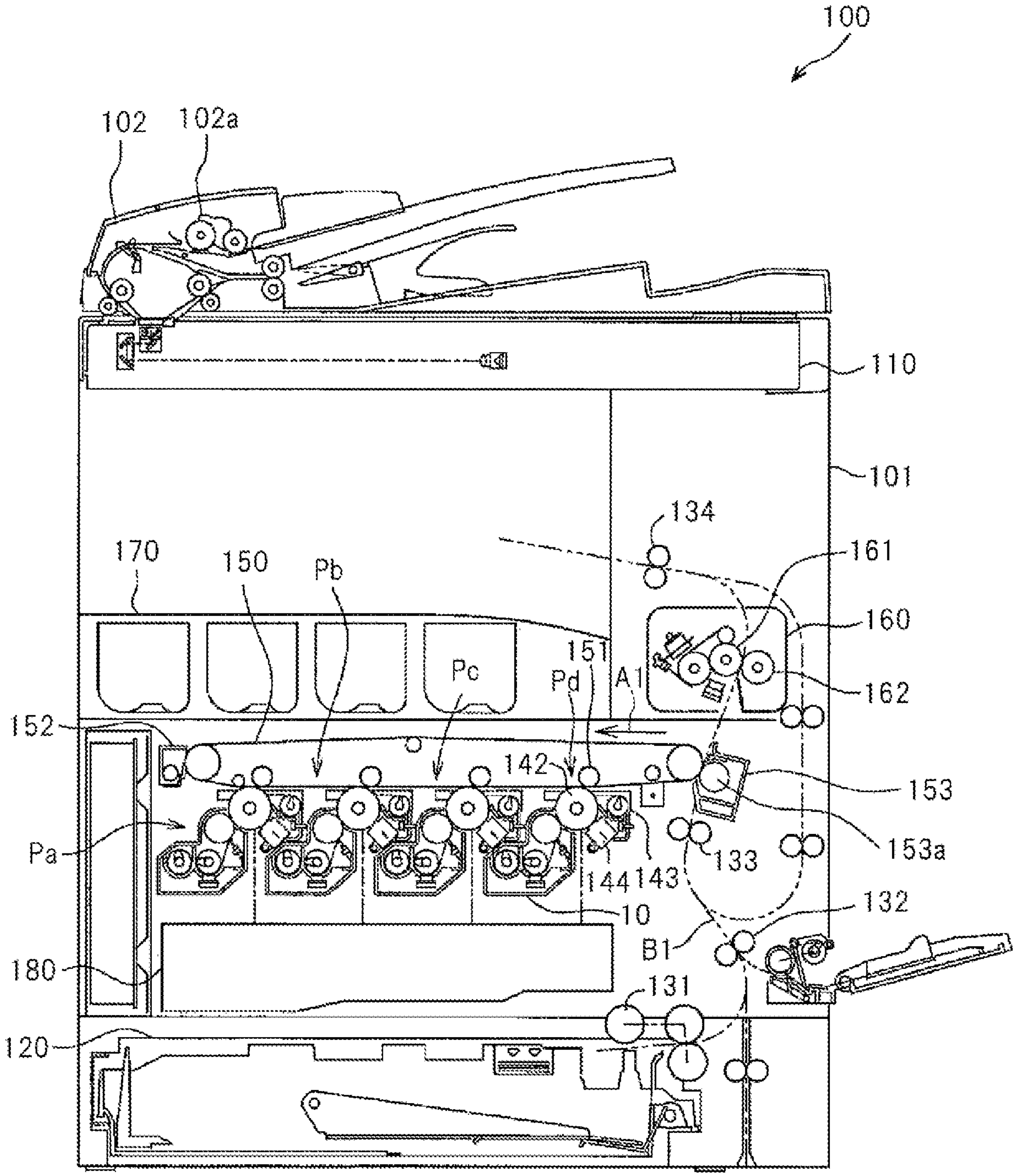
FIG. 1 is a sectional view illustrating a configuration of an image forming apparatus according to an Embodiment.

Hereinafter, Embodiments of the present disclosure will be described with reference to the accompanying drawings. In the drawings, the same or equivalent elements are denoted by the same reference numerals, and the duplicate description are omitted. Note that this Embodiment described below does not unreasonably limit contents described in the scope of claims. Moreover, all the configurations described in this Embodiment are not necessarily indispensable constituent elements for the present disclosure.

FIG. 1 is a sectional view illustrating a configuration of an image forming apparatus 100 according to an embodiment. The image forming apparatus 100 is an example of an electronic apparatus in which a developing device 10 described later is provided. For example, the image forming apparatus 100 is an apparatus having an image forming function of forming a color image or a monochrome image and a printing function of printing the formed image. The image forming apparatus 100 may be a printer, a printer with a scanning function, or an MFP (Multifunction Peripheral) having various functions including an image forming function and a printing function. In this Embodiment, the image forming apparatus 100 will be described as a multifunction peripheral as an example. For example, the image forming apparatus 100 has a printing function of forming a color image or a monochrome image and of printing the formed color image or monochrome image. Types of color used when the image forming apparatus 100 prints a color image are not limited, but may be black (Bk), cyan (Cy), magenta (Mg), and yellow (Ye), for example. Moreover, the image forming apparatus 100 prints a monochrome image using a single color (for example, black) on a sheet, for example.

For example, the image forming apparatus 100 includes an apparatus main body 101 and an apparatus lid 102 attached to the apparatus main body 101 capable of being opened/closed. For example, the apparatus lid 102 includes a conveyer 102*a* for conveying a document. For example, the apparatus main body 101 includes an image reading device 110, a feed tray 120 in which sheets on which images are formed (printed) are accommodated, a plurality of conveyance rollers, image forming stations Pa, Pb, Pc, Pd, an intermediate transfer belt 150, a belt cleaning device 152, a transfer device 153, a fusing device 160, an ejection tray 170, an optical scanning device 180 and the like. The plurality of conveyance rollers are sheet conveyance mechanisms that conveys a sheet on which an image is formed and includes, for example, a pickup roller 131, a conveyance roller 132, a resist roller 133, and an ejection roller 134. The optical scanning device 180 and the image forming stations Pa, Pb, Pc, Pd are image forming mechanisms that form a toner image (image for printing) to be transferred onto a sheet. The intermediate transfer belt 150, the belt cleaning device 152, the transfer device 153, and the fusing device 160 are a printing mechanism that performs printing by transferring a toner image (image for printing) formed by the image forming mechanism onto a sheet.

Although not shown, the apparatus main body 101 includes an operation acceptor, which is an input interface that receives an input operation from a user. The operation acceptor can be constituted by a touch panel, for example.

The image reading device 110 reads an image on a document placed on the image reading device 110 and stores image data indicating the read image in a memory 70 (FIG. 3), for example. The document to be read by the image reading device 110 may be conveyed by the conveyer 102*a* and read by the image reading device 110 or may be directly placed on the image reading device 110 so as to be read. Sheets before printing are stored in the feed tray 120. The feed tray 120 is provided in the apparatus main body 101, capable of being withdrawn, for example.

The image forming stations Pa, Pb, Pc, Pd are for intermediate transfer of a toner image (image) onto the surface of the intermediate transfer belt 150, and each of the image forming stations Pa, Pb, Pc, Pd is provided for each type of color used when the image forming apparatus 100 prints an image. For example, the image forming station Pa intermediately transfers a yellow toner image onto the intermediate transfer belt 150, the image forming station Pb intermediately transfers a magenta toner image onto the intermediate transfer belt 150, the image forming station Pc intermediately transfers a cyan toner image onto the intermediate transfer belt 150, and the image forming station Pd intermediately transfers a black toner image onto the intermediate transfer belt 150. Note that, in the case where the image forming apparatus 100 prints not a color image but only a monochrome image, only one of the image forming stations Pa, Pb, Pc, Pd may be provided.

Each of the image forming stations Pa, Pb, Pc, Pd includes a developing device 10, a photosensitive drum 142, a drum cleaning device 143, a charger 144 and the like. In any of the image forming stations Pa, Pb, Pc, Pd, the toner image is formed as follows. The drum cleaning device 143 removes and collects a residual toner left on a surface of the photosensitive drum 142. Thereafter, the charger 144 uniformly charges a surface of the photosensitive drum 142 to a predetermined potential. Then, the charged surface of the photosensitive drum 142 is exposed to light from the optical scanning device 180, and an electrostatic latent image is formed on the surface of the photosensitive drum 142. Thereafter, a toner is supplied to the electrostatic latent image formed on the surface of the rotating photosensitive drum 142 by the developing device 10, and developing processing of visualizing (developing) the electrostatic latent image is executed. As a result, toner images in the respective colors are formed on each of the photosensitive drums 142 included in each of the image forming stations Pa, Pb, Pc, Pd. In other words, an image is formed on each of the photosensitive drums 142. Note that the developing device 10 will be described in detail later.

The intermediate transfer belt 150 is provided so as to be in contact with the surface of each of the photosensitive drums 142 included in each of the image forming stations Pa, Pb, Pc, Pd. The intermediate transfer belt 150 circularly moves in an arrow A1 direction by the rotation of the plurality of intermediate transfer rollers 151. As a result, the toner images in the respective colors formed on the surface of each of the photosensitive drums 142 included in the respective image forming stations Pa, Pb, Pc, Pd are sequentially intermediately transferred onto the surface of the intermediate transfer belt 150. As described above, a color toner image is formed on the surface of the intermediate transfer belt 150. Then, the toner image formed on the surface of the intermediate transfer belt 150 is transferred to a surface of a sheet fed one by one from the feed tray 120 at a position corresponding to the transfer device 153.

The belt cleaning device 152 cleans the surface of the intermediate transfer belt 150. The belt cleaning device 152 is disposed so as to be in contact with the surface of the intermediate transfer belt 150 at a position downstream of the position at which the toner image on the intermediate transfer belt 150 is transferred to the sheet in the arrow A1 direction in which the intermediate transfer belt 150 circularly moves. As a result, the belt cleaning device 152 removes and collects the residual toner on the surface of the intermediate transfer belt 150.

The transfer device 153 has a transfer roller 153*a*. The transfer roller 153*a* is provided by opposing the surface of the intermediate transfer belt 150 so that a nip region is formed from the intermediate transfer belt 150. The toner image formed on the surface of the intermediate transfer belt 150 is transferred onto a sheet (a sheet before printing) conveyed to the nip region through a substantially S-shaped sheet conveyance path B1 (a sheet conveyance path to the ejection tray 170 after the sheet is fed from the feed tray 120)

while being sandwiched in the nip region between the transfer roller 153*a* and the intermediate transfer belt 150 and conveyed. Thereafter, the sheet having passed through the nip region between the transfer roller 153*a* and the intermediate transfer belt 150 (the sheet on which the toner image has been transferred) is conveyed to the fusing device 160.

The fusing device 160 includes a heating roller 161 and a pressure roller 162. The sheet to which the toner image has been transferred in the nip region is sandwiched between the heating roller 161 and the pressure roller 162 and is heated and pressurized. As a result, the toner image transferred onto the sheet is fixed. That is, the printing of the image on the surface of the sheet is completed.

In the sheet conveyance path Bl, the pickup roller 131, the conveyance roller 132, the resist roller 133, the intermediate transfer belt 150 and the transfer roller 153*a* described above, the heating roller 161 and the pressure roller 162 described above, and the ejection roller 134, which are plurality of rollers, are provided in this order.

A plurality of sheets before printing stored in the feed tray 120 are withdrawn one by one from the feed tray 120 by the pickup roller 131 and conveyed along the sheet conveyance path B1 by the conveyance roller 132 and the resist roller 133. Then, the sheet ejected from the resist roller 133 is conveyed by passing between the intermediate transfer belt 150 and the transfer roller 153*a* and between the heating roller 161 and the pressure roller 162 and is ejected to the ejection tray 170 via the ejection roller 134.

The resist roller 133 is provided at an upstream position immediately before the intermediate transfer belt 150 and the transfer roller 153*a* where the toner image is transferred onto the sheet in the sheet conveyance path B1. The resist roller 133 temporarily stops the sheet before the sheet is conveyed to the intermediate transfer belt 150 and the transfer roller 153*a* and aligns the leading edge of the sheet. The resist roller 133 temporarily stops the sheet and then, conveys the sheet at transfer timing of the toner image in the nip region between the intermediate transfer belt 150 and the transfer roller 153*a*. The conveyance roller 132 promotes conveyance of the sheet from the pickup roller 131 to the resist roller 133.

Figure 2:
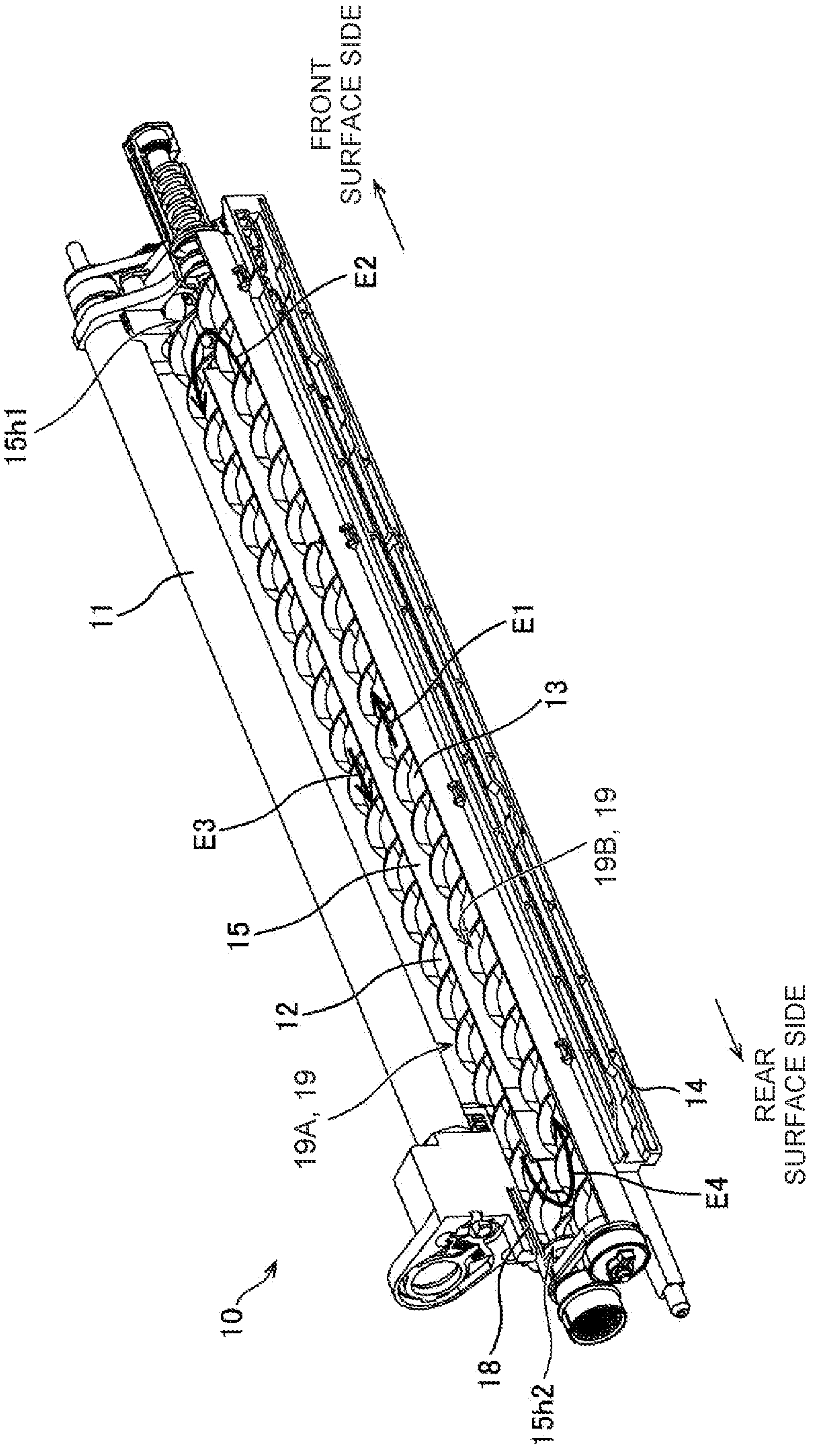
FIG. 2 is a perspective view illustrating a schematic configuration of a developing device according to the Embodiment.

Subsequently, a schematic configuration of the developing device 10 included in each of the image forming stations Pa, Pb, Pc, Pd will be described with reference to FIG. 2. FIG. 2 is a perspective view illustrating a schematic configuration of the developing device 10 according to the Embodiment. In FIG. 2, an upper housing is not shown in order to describe an inside of the developing device 10. Note that the developing devices 10 included in each of the image forming stations Pa, Pb, Pc, Pd have the same configuration except that the colors of toners to be used, which are different from one another. The developing device 10 is attached to the inside of the image forming apparatus 100 such that, in an extending direction of the developing device 10, a direction indicated by an arrow directed to lower left in FIG. 2 is a direction toward a rear surface side of the image forming apparatus 100, and a direction indicated by an arrow directed to upper right in FIG. 2 is a direction toward a front surface side of the image forming apparatus 100.

The developing device 10 includes a developing roller (developer carrier) 11, a first conveying screw (stirring and conveying member) 12, a second conveying screw 13, a housing 14 and the like. The housing 14 forms a developer tank 19 in which the developer, the first conveying screw 12, and the second conveying screw 13 are accommodated. The inside of the developer tank 19 is partitioned by a partition wall 15 into a supply tank (storage) 19A and a stirring tank 19B, and the developer is stored in each of the tanks. In other words, the developer tank 19 of the developing device 10 includes the supply tank 19A and the stirring tank 19B that accommodate the developer to be carried on the developing roller 11 described later.

The developing roller 11, which will be described in detail later, carries a developer on its surface and is attached to the developer tank 19 rotatably in a forward direction or a reverse direction. The developing roller 11 rotates in the forward direction during developing processing (image formation). The supply tank 19A is located below the developing roller 11, and the first conveying screw 12 is rotatably disposed inside. The first conveying screw 12 rotates to convey the developer while stirring the developer in the supply tank 19A. The stirring tank 19B is adjacent to the supply tank 19A, and the second conveying screw 13 is rotatably disposed inside. The second conveying screw 13 rotates so as to convey the developer in the stirring tank 19B while stirring the developer.

As the developer accommodated in the developer tank 19, a two-component developer containing a non-magnetic toner and a magnetic carrier can be used, for example. The developer accommodated in the stirring tank 19B is conveyed in a direction indicated by an arrow E1 along a longitudinal direction of the stirring tank 19B while being stirred by the rotation of the second conveying screw 13. By this stirring, friction is generated between the non-magnetic toner and the magnetic carrier contained in the developer, and the non-magnetic toner is charged by the friction. The developer conveyed in the direction indicated by the arrow E1 in the stirring tank 19B is conveyed from the stirring tank 19B to the supply tank 19A through an opening 15*h*1 formed at one end part of the partition wall 15 as indicated by an arrow E2. The developer conveyed to the supply tank 19A is conveyed along a longitudinal direction of the supply tank 19A in a direction indicated by an arrow E3, which is a direction opposite to the arrow E1, while being stirred by the rotation of the first conveying screw 12. Furthermore, though details will be described later, the developer conveyed in the supply tank 19A is conveyed in the supply tank 19A in the direction indicated by the arrow E3, while a part of the developer is drawn up to a surface of the developing roller 11 by a magnetic force from the developing roller 11. The developer conveyed in the direction indicated by the arrow E3 in the supply tank 19A is conveyed from the supply tank 19A to the stirring tank 19B through an opening 15*h*2 formed at the other end part of the partition wall 15 as indicated by an arrow E4. As described above, the developer is conveyed so as to circulate in the developer tank 19. Moreover, the toner consumed by the development is supplied into the developer tank 19 from a toner supply port 18 provided above the developer tank 19.

Figure 3:
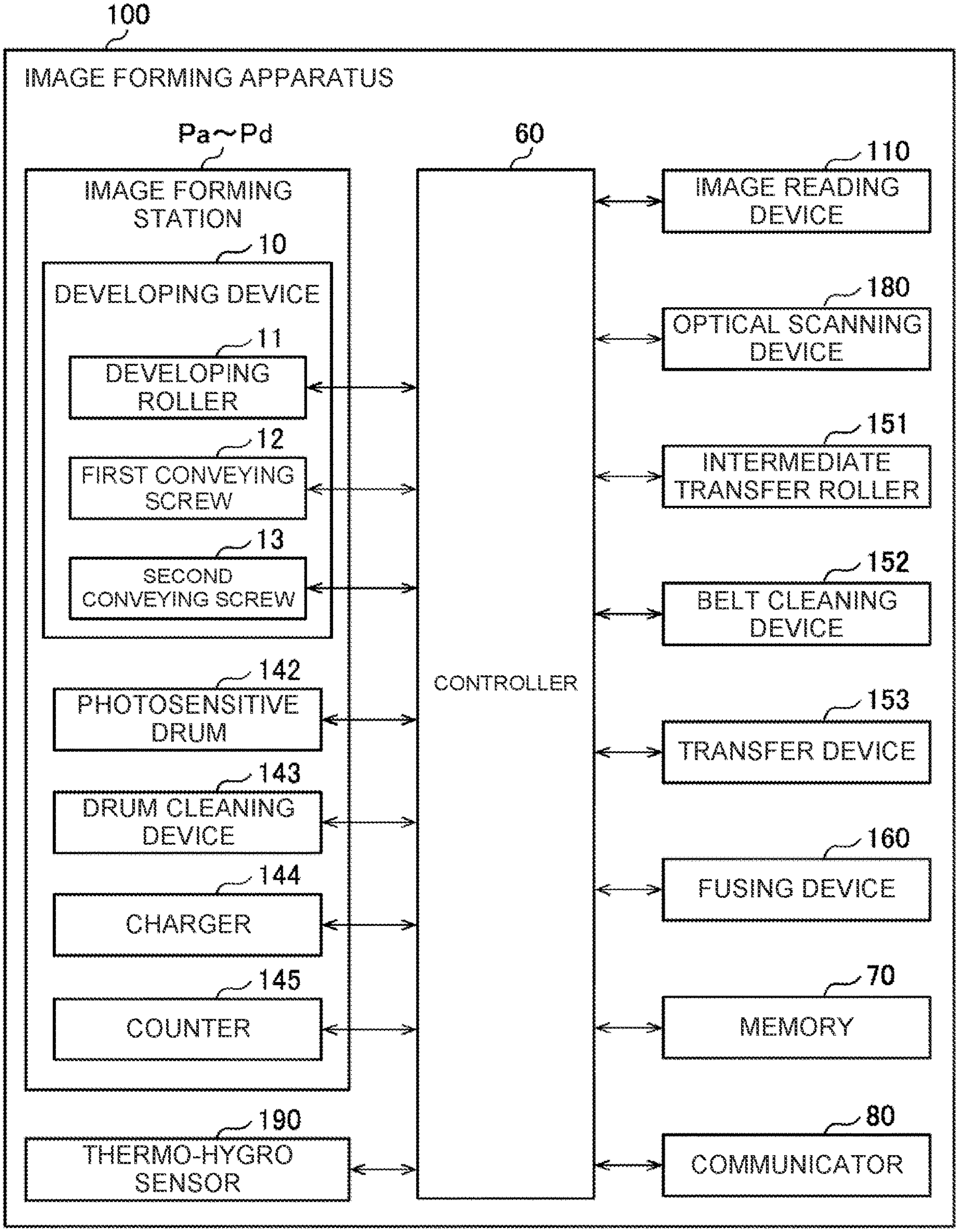
FIG. 3 is a functional block diagram illustrating a schematic configuration of the image forming apparatus according to the Embodiment.

FIG. 3 is a functional block diagram illustrating a schematic configuration of the image forming apparatus 100 according to the Embodiment. The image forming apparatus 100 includes a controller 60, a memory 70, a communicator 80, and a thermo-hygro sensor 190. Moreover, each of the image forming stations Pa to Pd includes a counter 145 that counts the rotation number of the photosensitive drum 142. Note that the counter 145 may be provided outside the image forming stations Pa to Pd as long as it can count the rotation number of the photosensitive drum 142 included in each of the image forming stations Pa to Pd.

The thermo-hygro sensor 190 measures a temperature and humidity and outputs information indicating each of the measured temperature and humidity to the controller 60. The thermo-hygro sensor 190 may be attached inside the apparatus main body 101 or may be attached outside the apparatus main body 101.

The controller 60 controls drive of each part provided in the image forming apparatus 100. The controller 60 has processors such as a CPU (Central Processing Unit), a GPU (Graphics Processing Unit), a DSP (Digital Signal Processor), and an ASIC (application specific integrated circuit). For example, the controller 60 reads and executes a computer-readable control program stored in the memory 70 so as to control drive of the image reading device 110, the plurality of conveyance rollers, the optical scanning device 180, the intermediate transfer roller 151, the belt cleaning device 152, the transfer device 153, the fusing device 160, the memory 70, the communicator 80, the photosensitive drum 142, the drum cleaning device 143, the charger 144, the counter 145, the thermo-hygro sensor 190, the developing roller 11, the first conveying screw 12, the second conveying screw 13 and the like. Moreover, the controller 60 acquires information indicating the rotation number of the photosensitive drum 142 counted by the counter 145 and calculates a travel distance by the rotation of the photosensitive drum 142. Moreover, the controller 60 acquires information indicating a temperature and humidity from the thermo-hygro sensor 190. Moreover, though details will be described later, the controller 60 executes a loosening mode that loosens a toner aggregate formed by aggregation of the toner of the developer in the developing device 10 based on the travel distance (in other words, the number of rotations) of the photosensitive drum 142.

The memory 70 is a computer-readable recording medium. The memory 70 may be a semiconductor memory such as SRAM (Static Random Access Memory), DRAM (Dynamic Random Access Memory), flash memory, ROM (Read Only Memory), and a flash memory, a register, a magnetic memory device such as an HDD (Hard Disk Drive), or an optical memory device such as an optical disc device. The memory 70 non-temporarily stores a control program (not shown). The control program stored in the memory 70 may be stored in advance in the memory 70 or may be supplied to the memory 70 via a wide area communication network including the Internet or the like.

The communicator 80 is an interface that conducts communication with external devices. The communicator 80 may include, for example, a FAX modem, may be an interface that conducts communication according to the USB standard, may be an interface that conducts communication according to the IEEE802.11 scheme, or may be an interface that conducts communication according to another scheme.

Figure 4:
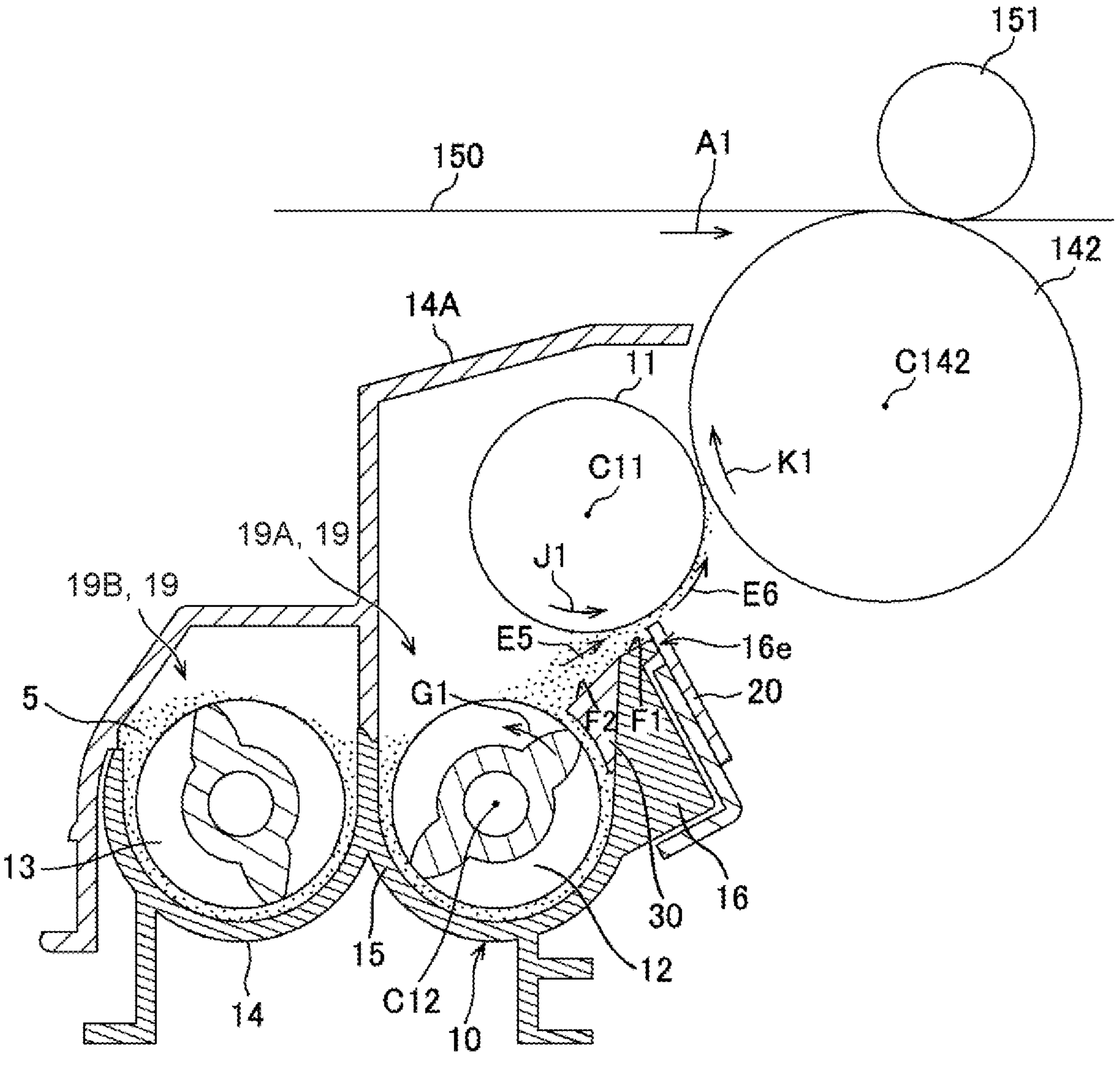
FIG. 4 is a diagram illustrating a state in which the developing device according to the Embodiment executes developing processing.

FIG. 4 is a diagram illustrating a state in which the developing device 10 according to the Embodiment executes developing processing. The developing device 10 in FIG. 4 illustrates a cross section cut in a direction orthogonal to the longitudinal direction. As shown in FIG. 4, an upper housing 14A that covers the developing roller 11, the first conveying screw 12 and the second conveying screw 13 is attached to the housing 14, and the developer tank 19 is formed by the housing 14 and the upper housing 14A. Moreover, the developing device 10 includes a doctor blade (layer regulating member) 20 and an inclined member 30. The developer 5 is stored in the developer tank 19.

The developing roller 11 is disposed above the supply tank 19A of the developer tank 19 and beside the photosensitive drum 142. The developing roller 11 is disposed so as to oppose the photosensitive drum 142. A magnet roller that forms a plurality of magnetic poles in a circumferential direction is disposed inside the developing roller 11, and a non-magnetic sleeve is provided so as to cover an outer circumference of the magnet roller. The developing roller 11 includes the magnet roller and the non-magnetic sleeve as described above and is attached to the developer tank 19 so that the magnet roller does not rotate and only the non-magnetic sleeve rotates. Hereinafter, for the sake of convenience, explanation will be made as "the developing roller 11 rotates" in some cases, but, to be precise, it means that "the non-magnetic sleeve of the developing roller 11 rotates". The magnet roller generates a magnetic force around the surface of the non-magnetic sleeve, that is, around the surface of the developing roller 11. The developing roller 11 draws up the developer 5 in the supply tank 19A of the developer tank 19 by the magnetic force, carries the developer 5 on the surface thereof, and rotates so as to transfer the developer 5 carried on the surface to a position opposed to the photosensitive drum 142.

The developer tank 19 has a side part 16 (a side opposed to the partition wall 15 via the first conveying screw 12) that forms a wall of an outside (side opposite to the partition wall 15) of the supply tank 19A. The side part 16 is disposed below the developing roller 11. Moreover, the side part 16 has a top surface opposed to the developing roller 11, and a first inclined surface F1 inclined with respect to a horizontal plane is formed on the top surface. The first inclined surface F1 is disposed so that a gap is provided from the surface of the developing roller 11.

The doctor blade 20 regulates the layer thickness of the developer 5 carried on the surface of the developing roller 11. The doctor blade 20 is attached so as to oppose a side surface 16*e* on an outer side of the side part 16 forming the a wall part on a side opposite to the partition wall 15 of the supply tank 19A (the side surface on the side opposite to the inner side surface in the supply tank 19A in the side part 16). Moreover, the doctor blade 20 is disposed such that a gap from the developing roller 11 (non-magnetic sleeve) is smaller than a gap between (the top portion of) the side part 16 and the developing roller 11 (non-magnetic sleeve). In other words, the doctor blade 20 protrudes from the first inclined surface F1 in a direction approaching the developing roller 11 and is disposed with a gap from the developing roller 11. As described above, the developer tank 19 to which the developing roller 11 and the doctor blade 20 are attached has the side part 16 on which the first inclined surface F1 is provided by opposing the developing roller 11 at a position adjacent to the doctor blade 20 and inclined with respect to the horizontal plane so that, as the first inclined surface F1 approaches the supply tank 19A from the doctor blade 20 side, the distance from the developing roller 11 becomes larger, and the doctor blade 20 is attached to (the side surface on the side opposite to the supply tank 19A of) the side part 16 so that a distance (a distance DG, which will be described later) from the developing roller 11 is smaller than the shortest distance (a distance D0, which will be described later) between the first inclined surface F1 and the developing roller 11.

Although details will be described later, the inclined member 30 is a guide member for smoothly returning the developer 5 between the developing roller 11 and the first inclined surface F1 to the supply tank 19A at the time of execution of a loosening mode that eliminates aggregation of a toner of the developer 5. For example, the inclined member 30 is provided between the side part 16 and the first conveying screw 12 and on an inner side surface of the side part 16. A top surface of the inclined member 30 opposing the developing roller 11 is a second inclined surface F2 inclined with respect to the horizontal plane. The second inclined surface F2 is adjacent to the first inclined surface F1 and is provided with a gap from the surface of the developing roller 11. An inclination angle of the second inclined surface F2 is steeper than the inclination angle of the first inclined surface F1.

During the developing processing, the controller 60 rotates the first conveying screw 12 counterclockwise around a rotation center C12 as indicated by an arrow Gl, rotates the developing roller 11 counterclockwise around a rotation center C11 as indicated by an arrow J1, and rotates the photosensitive drum 142 clockwise around a rotation center C142 as indicated by an arrow Kl. Note that a rotation direction in which the controller 60 rotates each of the first conveying screw 12, the developing roller 11, and the photosensitive drum 142 during the developing processing is referred to as a forward direction.

With the rotation of the first conveying screw 12 in the arrow G1 direction (forward direction), the developer 5 between the first conveying screw 12 and the inclined member 30 in the supply tank 19A is pushed up from below the second inclined surface F2 toward the second inclined surface F2 along the surface opposed to the first conveying screw 12 in the inclined member 30 and is drawn up from the surface of the first conveying screw 12 to the surface of the developing roller 11 along the second inclined surface F2 by a magnetic force from the first conveying screw 12 to a direction approaching the developing roller 11 as indicated by an arrow E5. The drawn-up developer 5 is carried on the surface of the developing roller 11. When the developing roller 11 rotates in the arrow J1 direction (forward direction), the developer 5 carried by the developing roller 11 passes through the gap between the developing roller 11 and the side part 16 along the first inclined surface F1 and then, passes through the gap between the developing roller 11 and the doctor blade. Since the gap between the developing roller 11 and the doctor blade is smaller than the gap between the developing roller 11 located on an upstream side in a rotation direction of the developing roller 11 rotating in the forward direction and the side part 16, as indicated by an arrow E6, the developer 5 carried on the surface of the developing roller 11 and having passed through the gap between the developing roller 11 and the doctor blade 20 is regulated to a predetermined layer thickness corresponding to a distance between the developing roller 11 and the doctor blade 20. And when the developer 5 regulated to the predetermined layer thickness and carried on the surface of the developing roller 11 approaches the photosensitive drum 142 with the rotation of the developing roller 11 in the arrow J1 direction (forward direction), the developer 5 rises due to the magnetic force in the direction approaching the photosensitive drum 142 from the developing roller 11, whereby the toner is supplied to electrostatic latent images formed on the surface of the photosensitive drum 142. As described above, the developing processing is executed. After this, the toner supplied to the surface of the photosensitive drum 142 is intermediately transferred onto the surface of the intermediate transfer belt 150 that circularly moves in the arrow A1 direction by the intermediate transfer rollers 151 with the rotation of the photosensitive drums 142 in an arrow K1 direction (forward direction).

Figure 5:
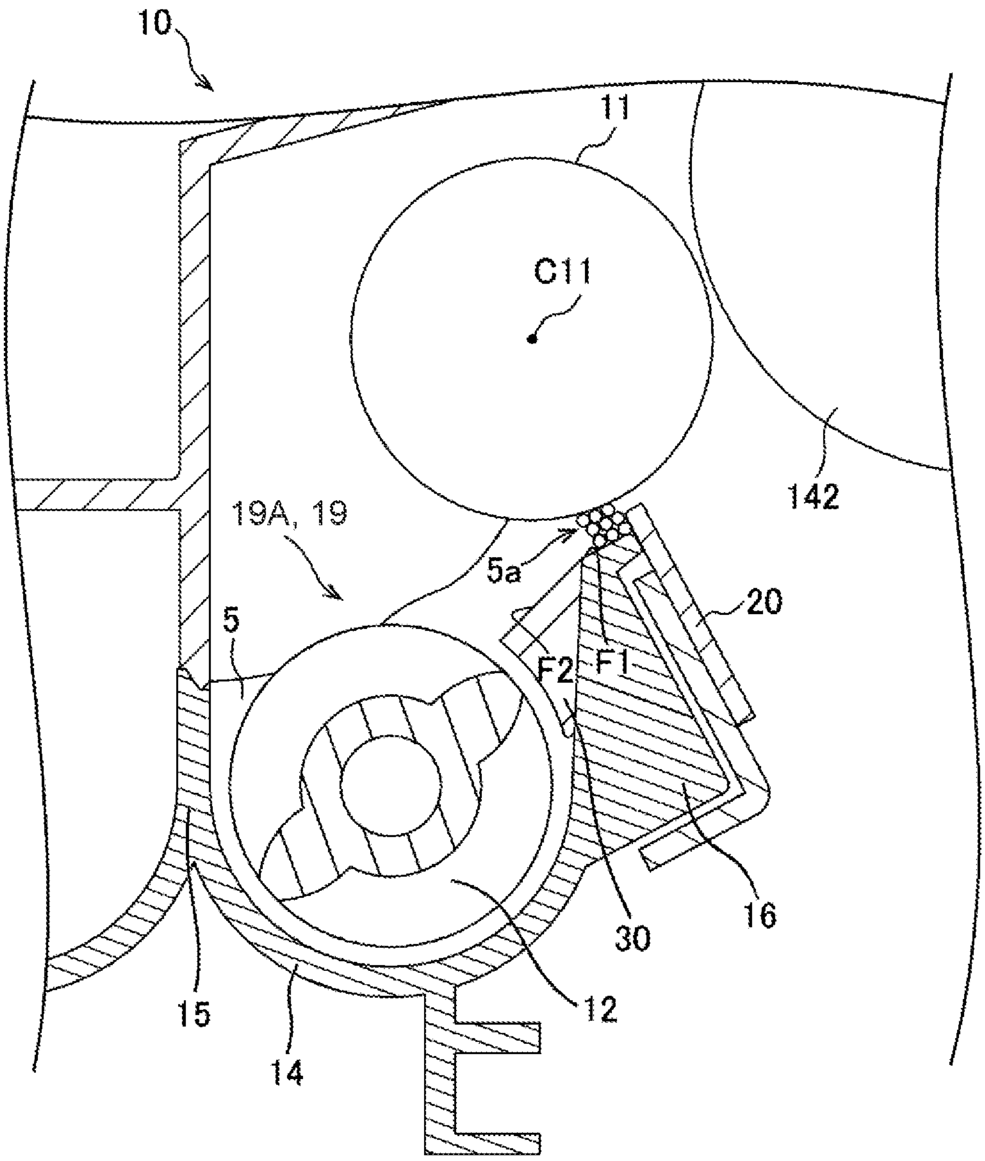
FIG. 5 is a view illustrating a state in which a toner aggregate is formed in the developing device according to the Embodiment.

FIG. 5 is a view illustrating a state in which a toner aggregate 5*a* is formed in the developing device 10 according to the Embodiment. When the developing device 10 executes the developing processing as described above, the toner aggregate 5*a* in which the toner contained in the developer 5 is aggregated may be formed at a corner part formed by the first inclined surface F1 and the doctor blade 20. And when the developing device 10 further continues the developing processing in a state where the toner-like aggregate 5*a* is formed, the toner aggregate 5*a* gradually grows over time, and the layer thickness of the developer 5 having passed through the gap between the developing roller 11 and the toner aggregate 5*a* becomes smaller than a predetermined layer thickness. When the layer thickness of the developer 5 carried on the surface of the developing roller 11 becomes smaller than the predetermined layer thickness, a predetermined amount of toner is not supplied any more to the surface of the photosensitive drum 142, which causes an image defect in which density of the image (toner image) formed on the surface of the photosensitive drum 142 becomes lower than a predetermined density, or a white spot occurs.

Thus, when a predetermined condition is satisfied, the image forming apparatus 100 according to this Embodiment executes the loosening mode that loosens the aggregation of the formed toner aggregate 5*a*, or has a structure in which the toner aggregate 5*a* whose aggregation has been loosened are easily removed from the gap between the first inclined surface F1 and the developing roller 11.

Subsequently, an example of the predetermined condition which is a reference for determining whether or not the controller 60 executes the loosening mode will be described by using FIG. 6. FIG. 6 is a diagram illustrating the predetermined condition for the controller 60 according to the Embodiment to execute the loosening mode. For example, the controller 60 determines whether or not the predetermined condition, which is a reference for determining whether or not to execute the loosening mode, is satisfied on the basis of environmental conditions including a temperature and humidity measured by the thermo-hygro sensor 190 and the cumulative rotation number (that is, the cumulative travel distance with the rotation of the photosensitive drum 142) counted by the counter 145 for the most recent predetermined period (the most recent four hours, for example) of the photosensitive drum 142 rotating during the developing processing.

In the table shown in FIG. 6, “0” is a range of temperatures and humidity in which the controller 60 determines not to execute the loosening mode, and “V1” is a range of temperatures and humidity in which the controller 60 determines to execute the loosening mode when the rotation number of the photosensitive drum 142 in the most recent predetermined period (the most recent four hours, for example) is 2000 rotations or more.

For example, when the temperature is relatively low and the humidity is low, the aggregation of the toner is unlikely to occur and thus, the controller 60 determines that the execution of the loosening mode is not necessary. On the other hand, when the temperature and humidity are relatively high, the aggregation of the toner is likely to occur and moreover, when the cumulative rotation number of the photosensitive drum 142 is relatively large, it can be determined that the developer 5 is in a state where the aggregation of the toner is likely to occur and thus, the controller 60 executes the loosening mode.

Specifically, in the example shown in FIG. 6, when the temperature is equal to or lower than 15° C., when the humidity exceeds 50% and is equal to or lower than 100% and moreover, when the rotation number of the photosensitive drum 142 satisfies the condition “V1”, the controller 60 determines that the predetermined condition is satisfied and executes the loosening mode after the developing processing is executed. Moreover, when the temperature exceeds 15° C. and is equal to or lower than 20° C., for example, when the humidity exceeds 40% and is equal to or lower than 100% and moreover, when the rotation number of the photosensitive drum 142 satisfies the condition “V1”, the controller 60 determines that the predetermined condition is satisfied and executes the loosening mode after the developing processing is executed. Moreover, when the temperature exceeds 20° C. and is equal to or lower than 25° C., for example, when the humidity exceeds 20% and is equal to or lower than 100% and moreover, when the rotation number of the photosensitive drum 142 satisfies the condition “V1”, the controller 60 determines that the predetermined condition is satisfied and executes the loosening mode after the developing processing is executed. Moreover, when the temperature exceeds 25° C. and is equal to or lower than 30° C., for example, when the humidity exceeds 10% and is equal to or lower than 100% and moreover, when the rotation number of the photosensitive drum 142 satisfies the condition “V1”, the controller 60 determines that the predetermined condition is satisfied and executes the loosening mode after the developing processing is executed. Moreover, when the temperature is equal to or higher than 30.1° C., for example, when the humidity is equal to or higher than 0% and is equal to or lower than 100% and moreover, when the rotation number of the photosensitive drum 142 satisfies the condition “V1”, the controller 60 determines that the predetermined condition is satisfied and executes the loosening mode after the developing processing is executed.

As described above, the controller 60 determines whether the predetermined condition as a reference for determining whether or not to execute the loosening mode is satisfied or not on the basis of the travel distance of the photosensitive drum 142 and the environmental condition. As described above, the controller 60 executes the loosening mode when there is a good possibility that aggregation of the toner has occurred, while the controller 60 does not execute the loosening mode when it is presumed that there is a good possibility that aggregation of the toner has not occurred. As a result, the controller 60 can efficiently remove the aggregation of the toner.

Note that the rotation number (2000 rotations) of the photosensitive drum 142 as a determination reference for determining whether the aforementioned condition “V1” is satisfied or not is an example and it may be another rotation number or further, it may be changed depending on whether the rotation speed of the photosensitive drum 142 is a low speed, a medium speed, or a high speed.

Figure 7:
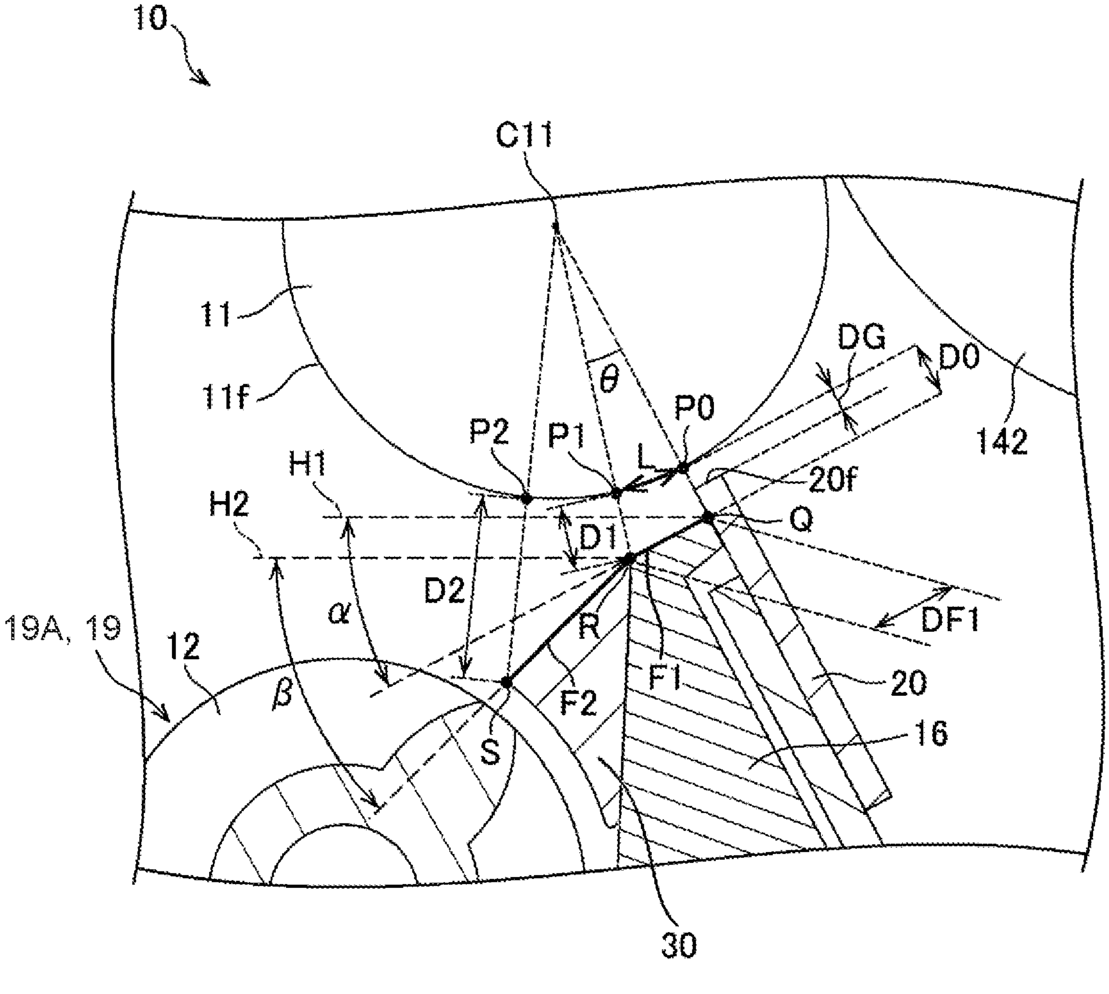
FIG. 7 is a diagram for explaining a detailed configuration of each part in the developing device according to the Embodiment.

Subsequently, with reference to FIGS. 7 to 9, the loosening mode executed by the image forming apparatus 100 and a structure that quickly removes the toner aggregate 5*a* whose aggregation has been loosened from the gap between the first inclined surface F1 and the developing roller 11 will be described.

First, a configuration of each part of the developing device 10 will be described in detail with reference to FIG. 7. FIG. 7 is a diagram for explaining a detailed configuration of each part in the developing device 10 according to the Embodiment. In FIG. 7, a cross section cut in a direction orthogonal to the longitudinal direction of the developing device 10 is illustrated, when the developing device 10 is viewed from the front side to the rear side.

A boundary part between the first inclined surface F1 and the second inclined surface F2 adjacent to each other is defined as an end part R. The end part R is an end part of the first inclined surface F1 which is in contact with the second inclined surface F2 and is also an end part of the second inclined surface F2 which is in contact with the first inclined surface F1. An end part of the first inclined surface F1 which is in contact with the doctor blade 20 is referred to as an end part Q. In the both end parts of the first inclined surface F1, the end part Q is on a side closer to the doctor blade 20, and the end part R is an end part on a side away from the doctor blade 20. In the second inclined surface F2, an end part on a side opposite to the first inclined surface F1 is referred to as an end part S. Of the both end parts in the second inclined surface F2, the end part R is an end part on a side closer to the first inclined surface F1, and the end part S is an end part on a side away from the first inclined surface F1.

The first inclined surface F1 is inclined from one end part Q to the other end part R so that the end part R is located below a horizontal plane H1 passing through the end part Q. The first inclined surface F1 is inclined only by an angle α with respect to the horizontal plane Hl.

The second inclined surface F2 is inclined from one end part R to the other end part S so that the end part S is located below a horizontal plane H2 passing through the end part R. The second inclined surface F2 is inclined downward from the horizontal plane H2 only by an angle β (angle β>angle α) larger than that of the first inclined surface F1. The second inclined surface F2 extends from the first inclined surface F1 so that the end part S on the side opposite to the first inclined surface F1 is located above the first conveying screw 12.

Among points on a surface 11*f* of the developing roller 11, an intersection of a virtual straight line from the rotation center C11 to the end part Q and the surface 11*f* is referred to as a point P0, an intersection of a virtual straight line from the rotation center C11 to the end part R and the surface 11*f* is referred to as a point P1, and an intersection of a virtual straight line from the rotation center C11 to the end part S and the surface 11*f* is referred to as a point P2. An angle formed by the point P0, the rotation center C11, and the point P1 is referred to as an angle θ, and a circumferential length from the point P0 to the point P1 (a length from the point P0 to the point P1 along the surface 11*f*) is referred to as a length L. A length between the both end parts (end part Q and end part R) of the first inclined surface F1 is referred to as a length DF1.

As described above, the gap between the doctor blade 20 and the developing roller 11 is smaller than the gap between the first inclined surface F1 and the developing roller 11. That is, the distance DG from a top surface 20*f* of the doctor blade 20 opposed to the developing roller 11 to the point P0 is smaller than the distance D0 from the point P0 to the end part Q.

The first inclined surface F1 is inclined with respect to the horizontal plane H1 such that a distance from the developing roller 11 becomes larger as the first inclined surface F1 approaches from the end part Q to the end part R, that is, as the first inclined surface F1 approaches from the doctor blade 20 to the inside of the supply tank 19A. That is, a distance D1 from the point P1 to the end part R is larger than the distance D0 from the point P0 to the end part Q.

Further, the second inclined surface F2 is inclined with respect to the horizontal plane H2 such that a distance from the developing roller 11 becomes larger as the second inclined surface F2 approaches from the end part R to the end part S, that is, as the second inclined surface F2 approaches from the end part R, which is closer to the first inclined surface F1, to the end part S on the opposite side.

That is, a distance D2 from the point P2 to the end part S is larger than the distance D1 from the point P1 to the end part R.

For example, a diameter of the developing roller 11 may be set to 18 mm, the angle θ to 15°, the length L to 2.3 mm, the length DF to 2.9 mm, and the distances D0 to 1.8 mm, but these numeral values are not limiting.

Subsequently, with reference to FIGS. 7 to 9, the loosening mode executed by the image forming apparatus 100 and a structure that quickly removes the toner aggregate 5*a* whose aggregation has been loosened from the gap between the first inclined surface F1 and the developing roller 11 will be described.

Figure 8:
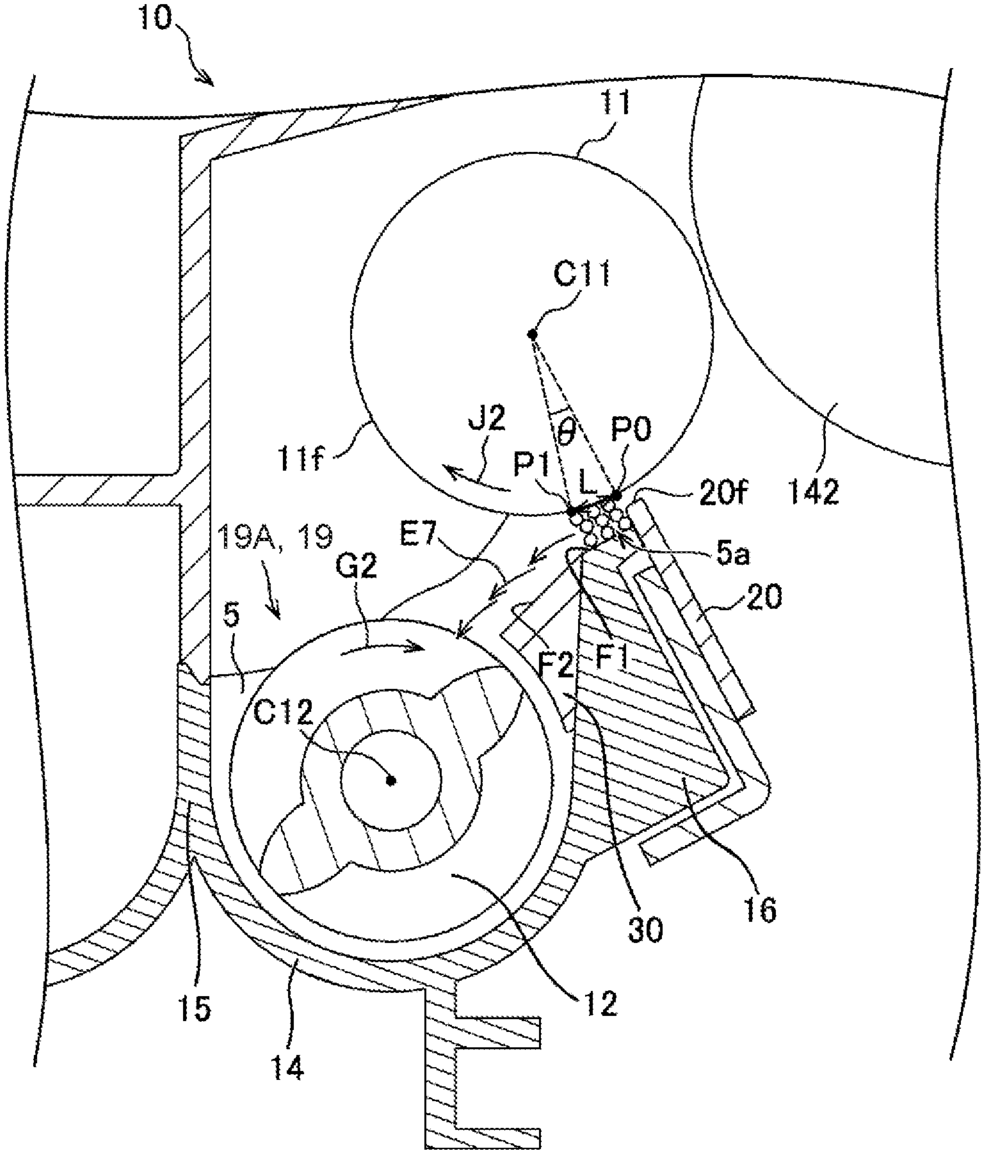
FIG. 8 is a diagram illustrating a state in which the controller according to the Embodiment rotates a developing roller in a reverse direction in the loosening mode.

FIG. 8 is a diagram illustrating a state in which the controller according to the Embodiment rotates the developing roller 11 in the reverse direction in the loosening mode. As described above, when the controller 60 determines that the predetermined condition is satisfied, the controller 60 can determine that there is good possibility that the toner aggregate 5*a* is formed at the corner part formed by the first inclined surface F1 and the doctor blade 20 and thus, executes the loosening mode after the execution of the developing processing is ended.

When the execution of the loosening mode is started, the controller 60 rotates the developing roller 11, which has stopped rotating after the developing processing was ended, in an arrow J2 direction, which is a direction opposite to the forward direction (the arrow J1 direction shown in FIG. 4). The arrow J2 direction is a clockwise direction around the rotation center C11. Further, the controller 60 rotates the first conveying screw 12 in the arrow G2 direction, which is a direction opposite to the forward direction (the arrow G1 direction shown in FIG. 4). The arrow G2 direction is a clockwise direction around the rotation center C12.

When the developing roller 11 rotates in the reverse direction (the arrow J2 direction), the aggregation of the toner aggregate 5*a* formed at the corner part between the first inclined surface F1 and the doctor blade 20 is loosened. Moreover, the developer 5 carried on the surface 11*f* of the developing roller 11 between the developing roller 11 and the first inclined surface F1 is transferred in a direction from the first inclined surface F1 toward the inside of the supply tank 19A as indicated by an arrow E7 and thus, the toner aggregate 5*a* whose aggregation was loosened is transferred in a direction toward the inside of the supply tank 19A along with a flow of the developer 5 transferred in the arrow E7 direction. As a result, the toner aggregate 5*a* aggregated at the corner part formed by the first inclined surface F1 and the doctor blade 20 can be transferred into the supply tank 19A.

In particular, the controller 60 rotates the developing roller 11 in the reverse direction (the arrow J2 direction) by a length L or more in the circumferential direction opposed to the first inclined surface F1. In other words, the controller 60 rotates the developing roller 11 in the reverse direction (the arrow J2 direction) by the angle θ or more. As described above, as compared with a case where the developing roller 11 is rotated in the reverse direction only by less than the circumferential length L, the aggregation of the toner aggregate 5*a* can be loosened more effectively, and as a result, the toner aggregate 5*a* can be removed from the corner part formed by the first inclined surface F1 and the doctor blade 20 more effectively.

Moreover, the first inclined surface F1 opposed to the developing roller 11 is inclined with respect to the horizontal plane H1 (FIG. 7) so that a distance from the developing roller 11 becomes larger as the first inclined surface F1 approaches from the doctor blade 20 to the inside of the supply tank 19A. That is, as described with reference to FIG. 7, the first inclined surface F1 is inclined with respect to the horizontal plane H1 so that the distance D1 from the point P1 to the end part R is larger than the distance D0 from the point P0 to the end part Q. As a result, the toner aggregate 5*a* aggregated at the corner part formed by the first inclined surface F1 and the doctor blade 20 can be more effectively transferred along the first inclined surface F1 to the supply tank 19A located below the first inclined surface F1. By means of the above, too, the toner aggregate 5*a* aggregated at the corner part formed by the first inclined surface F1 and the doctor blade 20 can be removed more effectively.

Moreover, the developing device 10 according to this Embodiment includes the second inclined surface F2 opposed to the developing roller 11 and adjacent to the first inclined surface F1 in the supply tank 19A. And the second inclined surface F2 is inclined downward from the horizontal plane H2 (FIG. 7) by the angle θ larger than that of the first inclined surface F1, and the end part S on a side opposite to the first inclined surface F1 is located above the first conveying screw 12. As a result, when the developing roller 11 rotates in the reverse direction (the arrow J2 direction in FIG. 8), the developer 5 transferred from the first inclined surface F1 to the second inclined surface F2 can be more effectively guided and transferred along the second inclined surface F2 to the first conveying screw 12, that is, into the supply tank 19A. As a result, since density of the developer 5 on the first inclined surface F1 can be lowered more effectively, the aggregation of the toner aggregate 5*a* aggregated at the corner part between the first inclined surface F1 and the doctor blade 20 can be loosened more effectively.

Moreover, when the developing roller 11 rotates in the reverse direction (the arrow J2 direction), the first conveying screw 12 rotates in the reverse direction (the arrow G2 direction), which is a direction in which the developer 5 is sent from the second inclined surface F2 to below the second inclined surface F2. This is because the first conveying screw 12 is rotated in a direction in which a liquid level of the developer 5 continuing from the first conveying screw 12 to the developing roller 11 is lowered and thus, the developer 5 on the second inclined surface F2 is liable to slide down into the supply tank 19A along the second inclined surface F2. When the developer 5 on the second inclined surface F2 slides down into the supply tank 19A, the density of the developer 5 on the first inclined surface F1 can be lowered more effectively. As a result, the aggregation of the toner aggregate 5*a* aggregated at the corner part formed by the first inclined surface F1 and the doctor blade 20 can be loosened more effectively.

Figure 9:
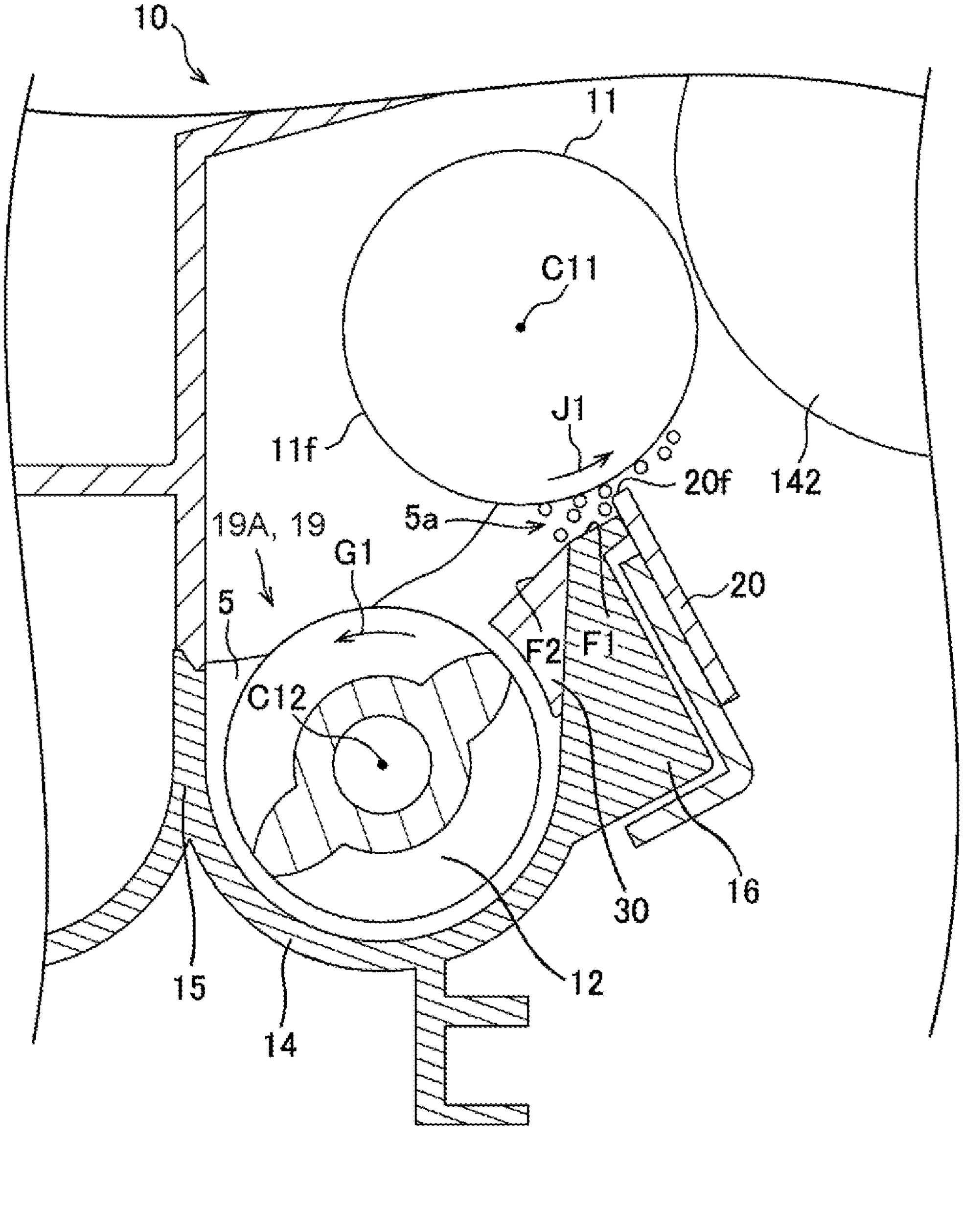
FIG. 9 is a diagram illustrating a state in which the controller according to the Embodiment rotates the developing roller in a forward direction in the loosening mode.

FIG. 9 is a diagram illustrating a state in which the controller according to the Embodiment rotates the developing roller 11 in the forward direction in the loosening mode. As described above, the controller 60 starts the execution of the loosening mode, rotates the developing roller 11 in the reverse direction by the circumferential length L or more, opposed to the first inclined surface F1, and then, as shown in FIG. 9, rotates the developing roller 11 in the forward direction (the arrow J1 direction). As a result, the toner aggregate 5*a* remaining between the first inclined surface F1 and the developing roller 11 can be loosened and removed from the gap between the developing roller 11 and the top surface 20*f* of the doctor blade 20. As a result, the toner aggregate 5*a* between the first inclined surface F1 and the developing roller 11 can be more effectively removed from between the developing roller 11 and the first inclined surface F1.

Moreover, when the developing roller 11 rotates in the forward direction (the arrow J1 direction), the controller 60 rotates the first conveying screw 12 in a direction (the forward direction indicated by the arrow G1), which is a direction in which the developer 5 in the supply tank 19A is pushed up from below the second inclined surface F2 to the second inclined surface F2. As a result, the developer 5 is supplied from the supply tank 19A onto the first inclined surface F1 along the second inclined surface F2. Then, the developer 5 supplied onto the first inclined surface F1 is carried on the surface 11*f* of the developing roller 11 rotating in the forward direction, passes through the gap between the developing roller 11 and the doctor blade 20, and is removed from between the first inclined surface F1 and the developing roller 11, whereby the toner aggregate 5*a* between the first inclined surface F1 and the developing roller 11 can be also removed more effectively.

As described above, in the developing device 10 according to this Embodiment, the first inclined surface F1 opposed to the developing roller 11 is inclined with respect to the horizontal plane H1 (FIG. 7) such that a distance from the developing roller (developer carrier) 11 becomes larger as the first inclined surface F1 approaches from the doctor blade (layer regulating member) 20 toward the inside of the supply tank (storage) 19A. In addition, (the controller 60 of) the image forming apparatus 100 rotates the developing roller 11 in the forward direction during image formation, and when a predetermined condition (FIG. 6) is satisfied, after the image formation is ended, executes the loosening mode in which the developing roller 11 is rotated in the direction opposite to the forward direction (the arrow J2 direction in FIG. 8) by the circumferential length L (FIGS. 7 and 8) or more opposed to the first inclined surface F1 and then, it is rotated in the forward direction (the arrow J1 direction in FIG. 9). As a result, when it can be determined that there is a good possibility that the toner aggregate 5*a* is formed at the corner part formed by the first inclined surface F1 and the doctor blade 20, the controller 60 rotates the developing roller 11 in the reverse direction by the circumferential length L (FIGS. 7 and 8) or more opposed to the first inclined surface F1 so as to sufficiently loosen the toner aggregate 5*a* and further, the first inclined surface F1 is inclined with respect to the horizontal plane H1 (FIG. 7) so as to efficiently drop the sufficiently loosened toner aggregate 5*a* along the first inclined surface F1 into the supply tank 19A. In addition, the controller 60 rotates the developing roller 11 in the reverse direction by the circumferential length L (FIGS. 7 and 8) or more opposed to the first inclined surface F1 so as to sufficiently loosen the toner aggregate 5*a* and then, rotates the developing roller 11 in the forward direction (the arrow J1 direction in FIG. 9) and thus, the toner aggregate 5*a* remaining between the developing roller 11 and the first inclined surface F1 can be efficiently removed from between the developing roller 11 and the first inclined surface F1 through the gap between the developing roller 11 and the top surface 20*f* of the doctor blade 20.

As described above, the image forming apparatus 100 according to this Embodiment can efficiently remove the toner aggregate 5a.

Moreover, the distance (distance D0 shown in FIG. 7) between the first inclined surface F1 and the developing roller 11 is preferably equal to or smaller than four times of the distance (distance DG shown in FIG. 7) between the doctor blade 20 and the developing roller 11. As a result, when the developing roller 11 is rotated in the forward direction and when the developing roller 11 is rotated in the reverse direction, the developer 5 carried on the surface 11*f* of the developing roller 11 can easily follow the rotation direction of the developing roller 11 and be transferred. Thus, as compared with the case where the distance (distance D0 shown in FIG. 7) between the first inclined surface F1 and the developing roller 11 exceeds four times of the distance (distance DG shown in FIG. 7) between the doctor blade 20 and the developing roller 11, the toner aggregate 5*a* formed between the first inclined surface F1 and the developing roller 11 can be loosened and removed from between the first inclined surface F1 and the developing roller 11 more effectively.

A speed at which the developing roller 11 rotates in the reverse direction when the controller 60 executes the loosening mode is preferably slower than the speed at which the developing roller 11 rotates in the forward direction during the developing processing. As a result, the toner aggregate 5*a* between the developing roller 11 and the first inclined surface F1 can be more effectively loosened.

As an example, the speed at which the developing roller 11 rotates in the forward direction during the developing processing can be 280 mm/s, the speed at which the developing roller 11 rotates in the reverse direction during the execution of the loosening mode can be 140 mm/s, and the speed at which the developing roller 11 rotates in the forward direction after rotating in the reverse direction during the execution of the loosening mode can be 140 mm/s. Note that the aforementioned speed of the developing roller 11 is an example, and the aforementioned speed is not limiting.

Figure 10:
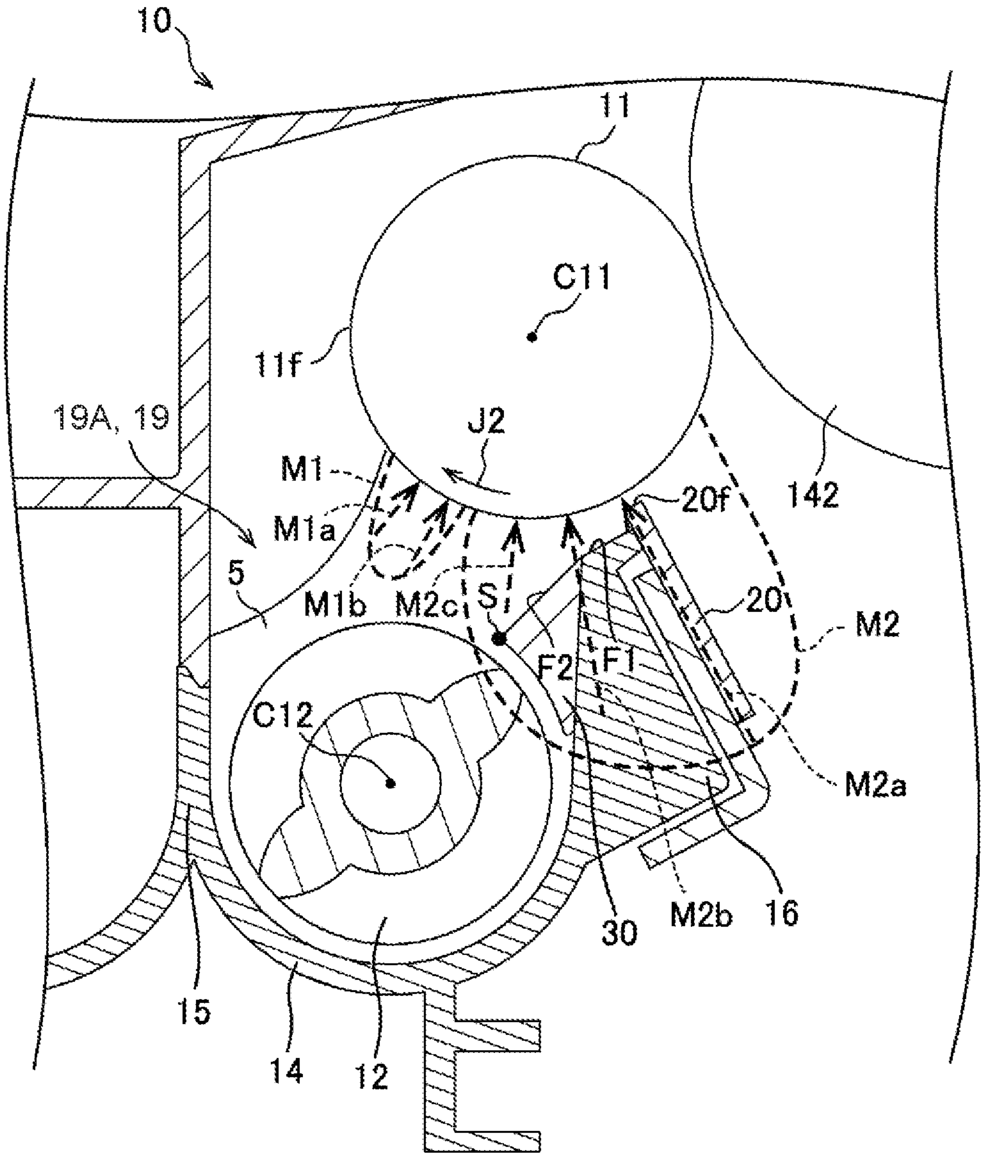
FIG. 10 is a diagram illustrating an example of a magnetic force generated around a surface of the developing roller according to the Embodiment.

FIG. 10 is a diagram illustrating an example of a magnetic force generated around the surface 11*f* of the developing roller 11 according to the Embodiment. As described above, the magnets provided inside the developing roller 11 generate a magnetic force around the surface 11*f* of the developing roller 11. FIG. 10 illustrates (the density of) a magnetic flux generated in a direction orthogonal to the circumferential surface of the developing roller 11, and the longer the arrow in the figure is, the higher (the density of) the generated magnetic flux is. For example, the developing roller 11 generates a drawn-up magnetic flux in a direction toward the developing roller 11 between the first conveying screw 12 and the developing roller 11 as the magnetic fluxes indicated by an arrow M1*a* and an arrow M1*b*. As a result, during the developing processing, the first conveying screw 12 rotates in the forward direction (the arrow G1 direction shown in FIG. 9) so that the developer 5 in the supply tank 19A can be drawn up to the surface of the developing roller 11 along the magnetic force indicated by the arrow M1*a* and the arrow M1*b*.

Moreover, as indicated by the arrows M2*a*, M2*b*, and M2*c*, the developing roller 11 preferably generates a magnetic force such that (the density of) the magnetic flux lowers from the doctor blade 20 toward the end part S in the second inclined surface F2 on the side opposite to the first inclined surface F1. As a result, (the density of) the magnetic flux in the direction orthogonal to the surface 11*f* of the developing roller 11 lowers as approaching from the doctor blade 20 toward the end part S in the second inclined surface F2 on the side opposite to the first inclined surface F1. Therefore, when the loosening mode is executed, the developer 5 carried on the surface 11*f* of the developing roller 11 rotating in the reverse direction (the arrow J2 direction) easily separates from the surface 11*f* as the developer 5 approaches from the doctor blade 20 toward the end part S, and easily drops into the supply tank 19A along the first inclined surface F1 and the second inclined surface F2. As a result, the toner aggregate 5*a* between the developing roller 11 and the first inclined surface F1 can be more efficiently loosened.

Figure 11:
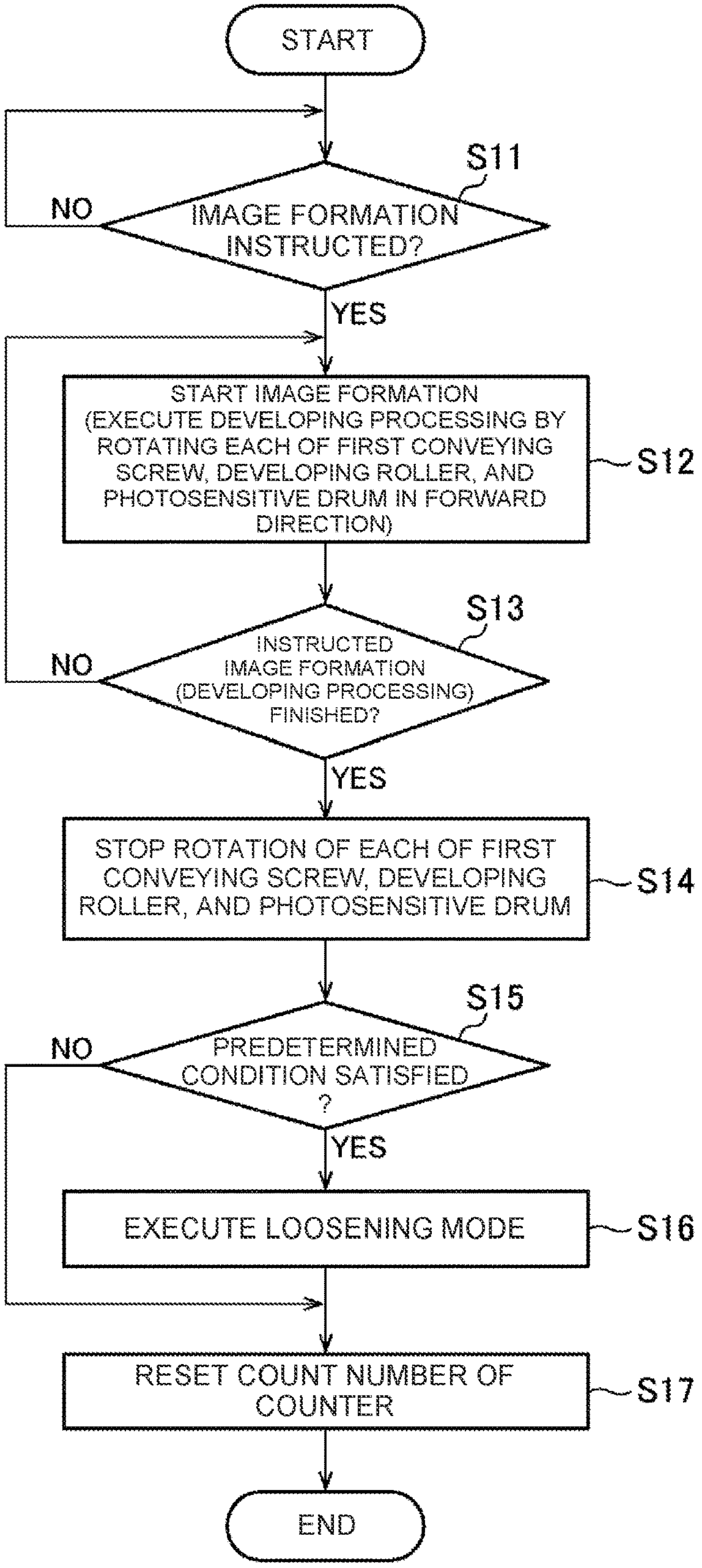
FIG. 11 is a chart illustrating a flow of processing of the image forming apparatus according to the Embodiment.

FIG. 11 is a chart illustrating a flow of the processing of the image forming apparatus 100 according to the Embodiment. At Step S11, the controller 60 stands by until an instruction to form an image is received (in case of NO at Step S11), and when the instruction to form an image is received (in case of YES at Step S11), at Step S12, the controller 60 starts image formation by rotating various rollers in the forward direction, for example. Specifically, the controller 60, for example, rotates each of the first conveying screw 12, the developing roller 11, the photosensitive drum 142 and the like in the forward direction and executes the developing processing. At this time, the counter 145 counts the rotation number of the rotating photosensitive drum 142.

Subsequently, at Step S13, the controller 60 determines whether the formation of all the instructed images has ended or not. In other words, the controller 60 determines whether the developing processing for forming all the instructed images has been ended or not.

At Step S13, when the controller 60 determines that the image formation (that is, the developing processing) has not been completed (NO at Step S13), the processing at Step S12 is repeated until the image formation (that is, the developing processing) is completed. At Step S13, when the controller 60 determines that the image formation (that is, the developing processing) has been completed (YES at Step S13), at Step S14, the controller 60 stops the rotation of each of the various rollers such as the first conveying screw 12, the developing roller 11, and the photosensitive drum 142, which have been rotated in the forward direction.

Subsequently, at Step S15, the controller 60 determines whether a predetermined condition (FIG. 6), which is a reference for determining whether to execute the loosening mode or not, is satisfied or not on the basis of the rotation number of the photosensitive drum 142 counted by the counter 145 and the temperature and humidity measured by the thermo-hygro sensor 190. Note that the controller 60 may perform the processing at Step S15 before completely stopping the rotation of the various rollers at Step S14.

At Step S15, when the controller 60 determines that the predetermined condition is satisfied (in case of YES at Step S15), the controller 60 can determine that there is a good possibility that the toner aggregate 5*a* is formed and thus, executes the loosening mode. That is, the controller 60 rotates the developing roller 11 and the first conveying screw 12 in the reverse direction as shown in FIG. 8, respectively, and then, rotates the developing roller 11 and the first conveying screw 12 in the forward direction as shown in FIG. 9, respectively. Subsequently, at Step S17, the counter 145 resets the count number obtained by counting the rotation number of the photosensitive drum 142. Then, the image forming apparatus 100 ends the operation.

At Step S15, when the controller 60 determines that the predetermined condition is not satisfied (in case of NO at Step S15), the controller 60 can determine that a possibility that the toner aggregate 5*a* is formed is low and thus, the image forming apparatus 100 ends the operation without executing the loosening mode.

As described above, the controller 60 executes the loosening mode only when the predetermined condition is satisfied and does not execute the loosening mode when the predetermined condition is not satisfied. As a result, since the unnecessary loosening mode is not executed even in the case where the predetermined condition that the possibility that the toner aggregate 5*a* is formed is low is satisfied, the toner aggregate 5*a* can be efficiently removed also from this point.

Figure 12:
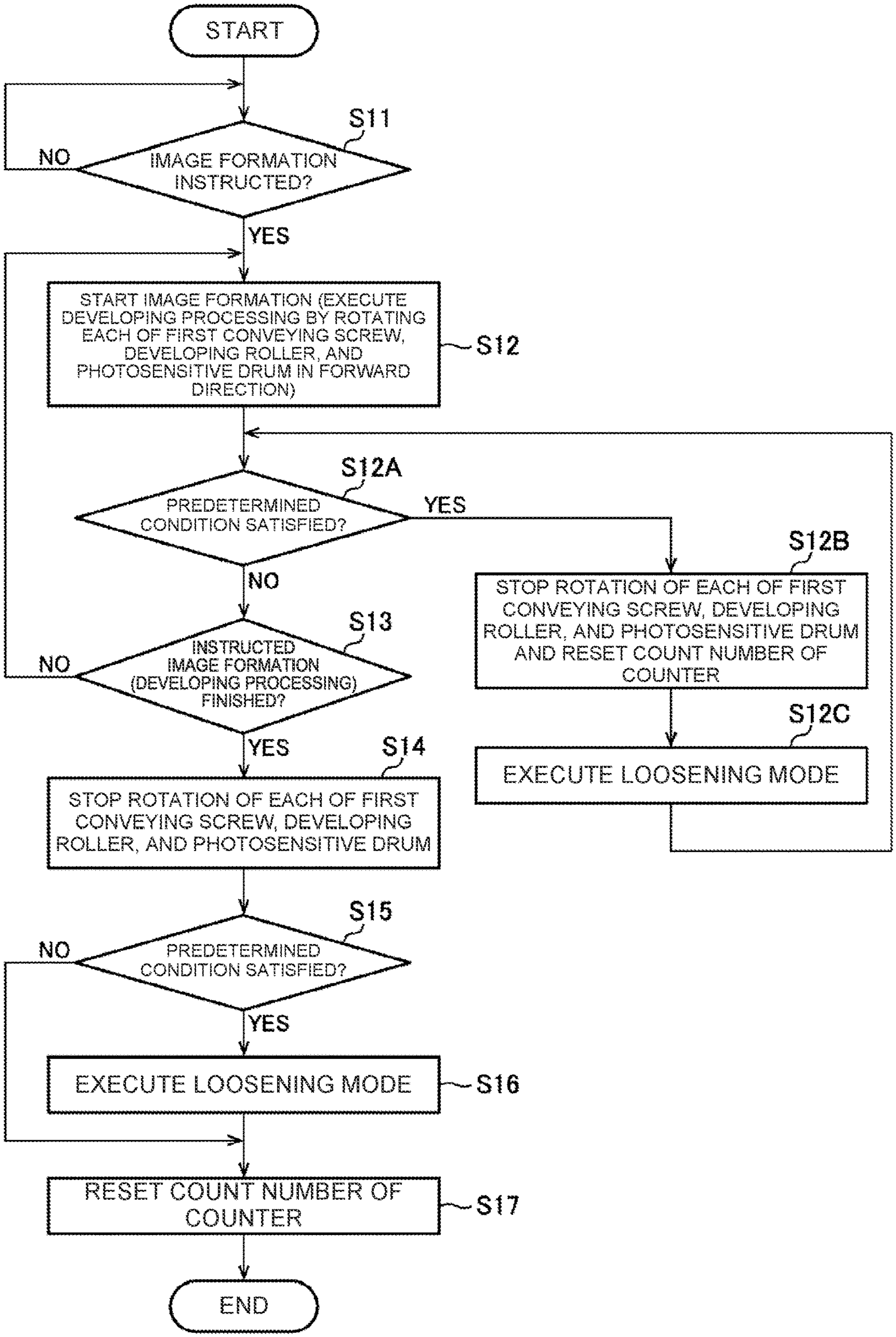
FIG. 12 is a chart illustrating a flow of processing of an image forming apparatus according to a modification of the Embodiment.

FIG. 12 is a chart illustrating a flow of processing of the image forming apparatus 100 according to a modification of the Embodiment. The image forming apparatus 100 may execute the loosening mode not only after the image formation is ended (the developing processing is ended), but also by temporarily interrupting the image formation (the developing processing) in a case where the predetermined condition is satisfied during the processing of the image formation (during the developing processing).

As shown in FIG. 12, the image forming apparatus 100 executes the processing at Steps S11 and S12 and then, at Step S12A, the controller 60 determines whether or not the predetermined condition (FIG. 6), which is a reference for determining whether or not to execute the loosening mode, is satisfied or not on the basis of the rotation number of the photosensitive drum 142 counted by the counter 145 and the temperature and humidity measured by the thermo-hygro sensor 190. Note that the controller 60 may execute the processing at Step S12A before the processing at Step S12 (before operating each part in order to form an image).

At Step 12A, when the controller 60 determines that the predetermined condition is satisfied (in case of YES at Step S12A), the controller 60 can determine that there is a good possibility that the toner aggregate 5*a* is formed and thus, at Step S12B, the controller 60 stops rotation in the forward direction of each of the first conveying screw 12, the developing roller 11, and the photosensitive drum 142 and resets the count number obtained by the counter 145 counting the rotation number of the photosensitive drum 142 and then, at Step S12C, executes the loosening mode. That is, the controller 60 rotates the developing roller 11 and the first conveying screw 12 in the reverse direction, respectively, as shown in FIG. 8 and then, rotates the developing roller 11 and the first conveying screw 12 in the forward direction, respectively, as shown in FIG. 9. Then, when the execution of the loosening mode at Step S12C is ended, the processing returns to Step S12A.

Alternatively, at Step S12A, when the controller 60 determines that the predetermined condition is not satisfied (in case of NO at Step S12A), the controller 60 can determine that the possibility that the toner aggregate 5*a* is formed is low and there is no need to execute the loosening mode and thus, executes the processing at Steps S13 to S17 described by using FIG. 11.

As described above, the image forming apparatus 100 may execute the loosening mode not only after the processing of the image formation but also by temporarily interrupting the image formation (the developing processing) in a case where the predetermined condition is satisfied also during the processing of the image formation (during the developing processing). As a result, the toner aggregate 5*a* between the developing roller 11 and the first inclined surface F1 can be more reliably removed from between the developing roller 11 and the first inclined surface F1.

Note that each of the elements appearing in the above-described Embodiment and modification may be combined as appropriate within a range in which no contradiction occurs.

What is claimed is:

1. An image forming apparatus comprising:

a developing device having a developer carrier that carries a developer on a surface and that is rotatable in a forward direction or a reverse direction;

a layer regulating member that regulates a layer thickness of the developer carried by the developer carrier; and a developer tank that has a storage that stores the developer to be carried by the developer carrier and to which the developer carrier and the layer regulating member are attached, wherein the developer tank has a side part on which a first inclined surface inclined with respect to a horizontal plane is provided at a position adjacent to the layer regulating member and opposite the developer carrier such that a distance from the developer carrier becomes larger as the first inclined surface becoming closer from a side of the layer regulating member to a side of the storage, the layer regulating member is attached to the side part such that a distance from the developer carrier is smaller than a shortest distance between the first inclined surface and the developer carrier, and the image forming apparatus executes a loosening mode in which the developer carrier is rotated in a forward direction during image formation, and when a predetermined condition is satisfied, after the image formation is ended, the developer carrier is rotated in the reverse direction by a length of a circumference of the developer carrier or more in a circumferential direction opposed to the first inclined surface-and then, rotated in the forward direction, wherein a distance, at a position nearest to the layer regulating member, between the first inclined surface and the developer carrier is equal to or smaller than four times of the distance between the layer regulating member and the developer carrier.

2. The image forming apparatus according to claim 1, further comprising, in the developer tank, a stirring and conveying member that conveys the developer while stirring the developer and a second inclined surface opposite the developer carrier and adjacent to the first inclined surface, wherein the second inclined surface is inclined downward from a horizontal plane at an angle larger than an angle of the first inclined surface, and an end part on the second inclined surface farther from the first inclined surface is located above the stirring and conveying member.

3. The image forming apparatus according to claim 2, wherein, when the developer carrier rotates in the forward direction, the stirring and conveying member rotates in a direction in which the developer in the developer tank is pushed up from below the second inclined surface toward the second inclined surface, and when the developer carrier rotates in the reverse direction, the stirring and conveying member rotates in a direction in which the developer is sent from the second inclined surface to below the second inclined surface.

4. The image forming apparatus according to claim 1, wherein a speed at which the developer carrier rotates in the reverse direction during the execution of the loosening mode is slower than a speed at which the developer carrier rotates in the forward direction during a developing processing.

5. The image forming apparatus according to claim 1, wherein the developer contains a toner, the image forming apparatus further comprising a photosensitive drum to which the toner contained in the developer carried by the developer carrier is supplied while rotating during a developing processing, and a controller of the image forming apparatus determines whether or not the predetermined condition is satisfied based on a travel distance by which the photosensitive drum has rotated and an environmental condition.

6. The image forming apparatus according to claim 2, wherein the developer carrier has a magnet inside, a magnetic flux generated by the magnet lowers from the layer regulating member toward the end part on the second inclined surface farther from the first inclined surface.

* * * * *